United States Patent [19]

Niwa et al.

[11] Patent Number: 4,758,647
[45] Date of Patent: Jul. 19, 1988

[54] PROCESS OF CROSSLINKING SILICONE RUBBER

[75] Inventors: Toshio Niwa; Yasuo Hirai, both of Yamaguchi, Japan

[73] Assignee: Kayaku Noury Corporation, Tokyo, Japan

[21] Appl. No.: 2,273

[22] Filed: Jan. 5, 1987

[51] Int. Cl.$^4$ .............................................. C08G 77/06
[52] U.S. Cl. ....................................... 528/24; 528/32; 525/474
[58] Field of Search ...................... 528/24, 32; 525/474

[56] References Cited

U.S. PATENT DOCUMENTS 4,260,536 4/1981 Yonezawa et al. ................. 525/478
4,329,275 5/1982 Hatanaka et al. ..................... 528/15
4,375,523 3/1983 Hatanaka et al. ..................... 528/24

FOREIGN PATENT DOCUMENTS 1719227 4/1971 Fed. Rep. of Germany .
868377 5/1961 United Kingdom .

*Primary Examiner*—Melvyn I. Marquis
*Attorney, Agent, or Firm*—Parkhurst & Oliff

[57] ABSTRACT

A process of crosslinking a silicone rubber using a combination of an aroyl peroxide and a solid peroxydicarbonate as crosslinking agent. The present process is attended with rapid crosslinking and results in products having favorable end properties, especially with regard to the absence of blooming.

5 Claims, No Drawings

PROCESS OF CROSSLINKING SILICONE RUBBER

This invention relates to a process of crosslinking a silicone rubber comprising heating the rubber in the presence of an aroyl peroxide. Such a process is known from, int. al., Japanese Patent Application No. 60,163,860, which describes the use of bis(trimethyl substituted benzoyl)peroxide, and U.S. Pat. No. 4,145,505, which describes the use of bis(o-chlorobenzoyl)peroxide as the crosslinking agent.

As is generally known, a process of this type involves compounding the rubber with the desired additives and heating the resulting compound. Heating may be done in one of various ways, for example using heated molds or using hot air vulcanization, the latter involving passing an extruded compound through a hot air furnace.

The use of aroyl peroxides has, up to the present time, not been fully satisfactory, especially with regard to hot air vulcanization. The main disadvantage resides in that the crosslinked products obtained display the so-called blooming effect, necessitating a post-cure treatment. Another disadvantage is found in the relatively long times required to attain the desired degrees of crosslinking. Both aspects render the prior art processes economically unattractive.

The present invention has for its object to meet these drawbacks. Accordingly, the process to which the invention relates is characterized in that in said rubber there is also present a peroxydicarbonate which is a solid at room temperature.

It should be noted that U.S. Pat. No. 4,260,536 discloses the use of a combination of peroxides in the hot air vulcanization of extruded silicone rubber compositions. The peroxides involved are aromatic acylorganic peroxides, such as di(2,4-dichlorobenzoyl)peroxide, and alkylorganic peroxides, such as di-tert.butyl peroxide. The latter group of peroxides is, of course, totally different from the peroxydicarbonates used in the present invention. Moreover, the rubber compositions described in this reference must meet specific other requirements, such as the presence of an organohydrogenpolysiloxane, and, as is apparent from the disclosure, in most cases there is need for a post-vulcanization treatment. This reference, therefore, neither discloses the present invention nor renders it obvious.

Silicone rubbers useful in the process of the present invention are those generally known in the art. Examples thereof are dimethyl silicone rubber, methyl vinyl silicone rubber, methyl phenyl silicone rubber, chloro silicone rubber and fluoro silicone rubber.

Aroyl peroxides and peroxydicarbonates useful in the present process are also generally known in the art. Preferred aroyl peroxides are those satisfying the general formula

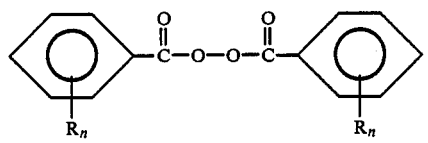

wherein $n=0, 1, 2$ or $3$ and $R=CH_3$ or $Cl$.

Typical aroyl peroxides and peroxydicarbonates to be used are mentioned in the Example below.

The peroxides may be incorporated into the rubber in accordance with known procedures. To this end the peroxides may be used separately or in premixed form. In a preferred embodiment the peroxides, prior to addition to the rubber, are formulated as pastes by employing silicone oil or phthalic esters, although use of the peroxides in their technically pure state is also feasible.

The amounts of the peroxides to be added preferably range from about 1 to about 10 mmoles of the aroyl peroxide and from about 0.5 to about 5 mmoles of the peroxydicarbonate per 100 grams of silicone rubber.

Of course, also other constituents, such as fillers (for example silica), plasticisers (for example silicone oil) and antidegradants, may be included in the rubber prior to the crosslinking reaction.

The temperature of the rubber during crosslinking is generally in the range of from about 90° C. to about 200° C.

The present invention is further described in the following Example, in which the following abbreviations are used.

OMBPO=di(o-methylbenzoyl)peroxide
BPO=dibenzoyl peroxide
MMBPO=di(m-methylbenzoyl)peroxide
23DMBPO=di(2,3-dimethylbenzoyl)peroxide
24DMBPO=di(2,4-dimethylbenzoyl)peroxide
25DMBPO=di(2,5-dimethylbenzoyl)peroxide
26DMBPO=di(2,6-dimethylbenzoyl)peroxide
234TMBPO=di(2,3,4-trimethylbenzoyl)peroxide
245TMBPO=di(2,4,5-trimethylbenzoyl)peroxide
235TMBPO=di(2,3,5-trimethylbenzoyl)peroxide
OCBPO=di(o-chlorobenzoyl)peroxide
PCBPO=di(p-chlorobenzoyl)peroxide
24DCBPO=di(2,4-dichlorobenzoyl)peroxide
TCPD=di(4-tert.butylcyclohexyl)peroxydicarbonate
PEPD=di(2-phenoxyethyl)peroxydicarbonate
DCPD=dicetyl peroxydicarbonate
DMPD=dimyristyl peroxydicarbonate
DBPD=dibenzyl peroxydicarbonate

EXAMPLE

The Example describes the crosslinking of methyl vinyl silicone rubber using various combinations of an aroyl peroxide and a peroxydicarbonate. The combinations used are given in the Table below. All the tests were carried out as follows.

Two pastes, one consisting of 50 wt.% of an aroyl peroxide and 50 wt.% of a dimethyl silicone oil, the other consisting of 50 wt.% of a peroxydicarbonate and 50 wt.% of a dimethyl silicone oil, were each prepared by milling the components in the appropriate amounts on a three-roll mill. Subsequently, 1 part by weight of the paste containing the aroyl peroxide and 0.5 parts by weight of the paste containing the peroxydicarbonate were mixed with 100 parts by weight of methyl vinyl silicone rubber on a two-roll mill. The resulting compound was used for carrying out three types of crosslinking experiments A, B and C (see below).

Comparative experiments were performed in which as crosslinking agent there were used 1.5 parts by weight of pastes consisting of 50 wt.% of an aroyl peroxide (OCBPO, 234TMBPO or 245TMBPO) and 50 wt.% of a dimethyl silicone oil.

(A) Part of the compound was rolled into a sheet having a thickness of 2 mm. A sample of this sheet was placed in a heated mold and crosslinked for 10 min. at 120° C. Of the crosslinked sheet the tensile strength and the elongation were measured in accordance with JIS- K-6301. Blooming was judged by visual inspection of the surfaces one day and seven days after crosslinking, respectively.

The results are summarized in the Table, wherein "—" means no blooming and "+" means that some blooming was observed.

(B) Another part of the compound was also rolled into a sheet 2 mm thick. The sheet was subsequently hot-air vulcanized in a Geer-oven for 30 min. at 180° C. (air temperature 300°–400° C.). Blooming of the crosslinked sheet was assessed by visual inspection.

The results are summarized in the Table.

The sheets were also assessed for their hardness by means of a Type A Hardness Meter in accordance with JIS-K-6301 and their surface thickness. In addition, cross sections of the sheets were analyzed for foaming during the vulcanization. No significant differences were found between the products obtained using the process of the invention and those obtained in accordance with the prior art teachings, viz. all the products had about the same hardness, none of the products was tacky and there had been no foaming in any of the vulcanizations.

(C) Still another part of the compound was analyzed for its crosslinking behaviour in terms of $t_{10}$ (induction period), $t_{90}$ (period to reach optimum crosslinking) and $\Delta$torque by means of a JSR Curelastometer Model II at 120° C.

The results are given in the Table.

From the data in the Table it is readily apparent that
(1) the crosslinking reactions according to the invention are faster than those according to prior teachings,
(2) the products obtained according to the invention process show favorable end properties as compared with the products obtained employing prior art crosslinking agents, especially in that blooming is virtually absent.

TABLE

| Crosslinking agent | Exp. A | | | | Exp. B | | Exp. C | | |
|---|---|---|---|---|---|---|---|---|---|
| | Tensile strength (kg/cm$^2$) | Elongation (%) | Blooming | | Blooming | | $t_{10}$ (min) | $t_{90}$ (min) | $\Delta$torque (kg · cm) |
| | | | 1 day | 7 days | 1 day | 7 days | | | |
| OMBPO/TCPD | 97.0 | 743 | — | — | — | — | 0.2 | 0.9 | 44.0 |
| OMBPO/PEPD | 98.0 | 752 | — | — | — | — | 0.2 | 0.9 | 44.7 |
| OMBPO/DCPD | 94.3 | 687 | — | — | — | — | 0.3 | 0.9 | 43.8 |
| OMBPO/DMPD | 95.2 | 704 | — | — | — | — | 0.3 | 0.8 | 44.0 |
| OMBPO/DBPD | 98.5 | 793 | — | — | — | — | 0.2 | 0.8 | 45.3 |
| BPO/TCPD | 94.2 | 700 | — | — | — | — | 0.2 | 0.7 | 46.5 |
| MMBPO/TCPD | 91.8 | 675 | — | — | — | — | 0.4 | 0.9 | 44.0 |
| 23DMBPO/TCPD | 92.0 | 694 | — | — | — | — | 0.3 | 0.8 | 47.0 |
| 24DMBPO/TCPD | 101.7 | 780 | — | — | — | — | 0.2 | 0.5 | 49.5 |
| 25DMBPO/TCPD | 91.8 | 705 | — | — | — | — | 0.3 | 0.6 | 46.0 |
| 26DMBPO/TCPD | 92.0 | 738 | — | — | — | — | 0.3 | 0.6 | 46.7 |
| 234TMBPO/TCPD | 93.4 | 840 | — | — | — | — | 0.2 | 0.5 | 48.0 |
| 245TMBPO/TCPD | 93.1 | 830 | — | — | — | — | 0.2 | 0.5 | 47.5 |
| 235TMBPO/TCPD | 93.8 | 840 | — | — | — | — | 0.2 | 0.5 | 48.2 |
| OCBPO/TCPD | 94.5 | 705 | — | — | — | — | 0.2 | 0.6 | 47.5 |
| PCBPO/TCPD | 94.0 | 700 | — | — | — | — | 0.2 | 0.7 | 47.0 |
| 24DCBPO/TCPD | 94.2 | 708 | — | — | — | + | 0.2 | 0.6 | 47.7 |
| OCBPO | 91.5 | 617 | + | + | + | + | 0.3 | 1.0 | 45.1 |
| 234TMBPO | 89.5 | 618 | — | + | — | + | 0.3 | 1.8 | 42.7 |
| 245TMBPO | 87.4 | 587 | — | + | — | + | 0.3 | 1.8 | 42.5 |

We claim:
1. A process of crosslinking a silicone rubber comprising heating the rubber in the concurrent presence of both a crosslinking agent effective amount of an aroyl peroxide and a crosslinking agent effective amount of a peroxydicarbonate which is a solid at room temperature.

2. A process according to claim 1, wherein said aroyl peroxide is present in an amount of from about 1 to about 10 mmoles, and said peroxydicarbonate is present in an amount of from about 0.5 to about 5 mmoles, per 100 grams of the silicone rubber.

3. A process according to claim 1, wherein said silicone rubber is selected from the group consisting of dimethyl silicone rubber, methyl vinyl silicone rubber, methyl phenyl silicone rubber, chloro silicone rubber and fluoro silicone rubber.

4. A process according to claim 1, wherein said aroyl peroxide is selected from the group consisting of di(o-methylbenzoyl)peroxide, dibenzoyl peroxide, di(m-methylbenzoyl)peroxide, di(2,3-dimethylbenzoyl)peroxide, di(2,4-dimethylbenzoyl)peroxide, di(2,5-dimethylbenzoyl)peroxide, di(2,6-dimethylbenzoyl)peroxide, di(2,3,4-trimethylbenzoyl)peroxide, di(2,4,5-trimethylbenzoyl)peroxide, di(2,3,5-trimethylbenzoyl)peroxide, di(o-chlorobenzoyl)peroxide, di(p-chlorobenzoyl)peroxide and di(2,4-dichlorobenzoyl)peroxide.

5. A process according to claim 1, wherein said peroxydicarbonate is selected from the group consisting of di(4-tert.butylcyclohexyl)peroxydicarbonate, di(2-phenoxyethyl)peroxydicarbonate, dicetyl peroxydicarbonate, dimyristyl peroxydicarbonate and dibenzyl peroxydicarbonate.

* * * * *

UNITED STATES PATENT AND TRADEMARK OFFICE
CERTIFICATE OF CORRECTION

PATENT NO. : 4,758,647

DATED : July 19, 1988

INVENTOR(S) : Toshio NIWA et al

It is certified that error appears in the above-identified patent and that said Letters Patent is hereby corrected as shown below:

Column 3, line 38, change "thickness." to --tackiness.--.

Signed and Sealed this

Sixth Day of December, 1988

Attest:

DONALD J. QUIGG

Attesting Officer

Commissioner of Patents and Trademarks